(12) United States Patent
Michalewich

(10) Patent No.: US 11,834,548 B2
(45) Date of Patent: Dec. 5, 2023

(54) METHOD OF MAKING GOLF BALL INCORPORATING IMPROVED POLYURETHANE MATERIALS AND RESULTING GOLF BALL

(71) Applicant: Acushnet Company, Fairhaven, MA (US)

(72) Inventor: Michael Michalewich, Norton, MA (US)

(73) Assignee: Acushnet Company, Fairhaven, MA (US)

(*) Notice: Subject to any disclaimer, the term of this patent is extended or adjusted under 35 U.S.C. 154(b) by 334 days.

(21) Appl. No.: 17/188,270

(22) Filed: Mar. 1, 2021

(65) Prior Publication Data
US 2021/0301067 A1    Sep. 30, 2021

Related U.S. Application Data

(60) Provisional application No. 63/000,662, filed on Mar. 27, 2020.

(51) Int. Cl.
| | | |
|---|---|---|
| *C08G 18/75* | (2006.01) | |
| *C08G 18/38* | (2006.01) | |
| *C08G 18/32* | (2006.01) | |
| *C08G 18/48* | (2006.01) | |
| *C08G 18/12* | (2006.01) | |
| *A63B 37/00* | (2006.01) | |
| *A63B 102/32* | (2015.01) | |
| *A63B 45/00* | (2006.01) | |

(52) U.S. Cl.
CPC ........... *C08G 18/757* (2013.01); *C08G 18/12* (2013.01); *C08G 18/324* (2013.01); *C08G 18/3206* (2013.01); *C08G 18/3819* (2013.01); *C08G 18/3865* (2013.01); *C08G 18/4854* (2013.01); *A63B 37/0039* (2013.01); *A63B 37/0059* (2013.01); *A63B 45/00* (2013.01); *A63B 2102/32* (2015.10)

(58) Field of Classification Search
CPC .............. C08G 18/757; C08G 18/3206; C08G 18/324; C08G 18/3819; C08G 18/4854; C08G 18/12; C08G 18/3865; A63B 37/0039; A63B 37/0059; A63B 45/00; A63B 2102/32
See application file for complete search history.

(56) References Cited

U.S. PATENT DOCUMENTS

| 2006/0030680 A1* | 2/2006 | Kuntimaddi | ....... C08G 18/7657 |
| | | | 525/453 |
| 2006/0040767 A1* | 2/2006 | Cavallaro | .............. C08G 18/12 |
| | | | 473/371 |

* cited by examiner

*Primary Examiner* — Rabon A Sergent

(57) ABSTRACT

Method of making a golf ball comprising the steps of: providing a subassembly; forming about the subassembly at least one layer comprised of a thermoset polyurethane which is prepared by mixing as the essential ingredients: (i) at least one long chain soft segment polyol and/or polyamine; (ii) at least one short chain-extending-type species; (iii) at least one isocyanate; and (iv) at least one additional chain-extending-type species; wherein essential ingredients (i) and (ii) are combined (reacted/mixed) to form a first sub-mixture; followed by combining/mixing the first sub-mixture and essential ingredient (iii) to form a prepolymer second sub-mixture; followed by combining (reacting/mixing) the prepolymer second sub-mixture with essential ingredient (iv) to form the thermoset polyurethane. Essential ingredients (ii) and (iv) may differ, or in some embodiments, are the same, although the total amount of essential ingredients (ii) included is preferably greater than the total amount of essential ingredient (iv).

19 Claims, No Drawings

METHOD OF MAKING GOLF BALL INCORPORATING IMPROVED POLYURETHANE MATERIALS AND RESULTING GOLF BALL

CROSS-REFERENCE TO RELATED APPLICATIONS

This application claims the benefit of U.S. Provisional Application No. 63/000,662, filed Mar. 27, 2020, which is hereby incorporated herein in its entirety.

FIELD OF THE INVENTION

Methods of making golf balls incorporating improved thermoset polyurethane materials and the resulting improved golf balls.

BACKGROUND OF THE INVENTION

Both professional and amateur golfers use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

Three-piece, four-piece, and even five-piece balls have become more popular over the years. Golfers are playing with multi-piece balls for several reasons, including availability of lower-cost materials and the development of new manufacturing technologies which make it possible and cost-effective to produce a multi-layered golf ball having unique desirable resulting performance characteristics. In multi-layered golf balls, each of the core, intermediate layer and cover can be single or multi-layered, and properties such as hardness, modulus, compression, resilience, core diameter, intermediate layer thickness and cover thickness can be preselected and coordinated to target play characteristics such as spin, initial velocity and feel of the resulting golf ball.

Meanwhile, different layer materials can also be preselected in these golf ball constructions to impart specific properties and playing features to the ball. In this regard, thermoset polyurethane materials possess desired mechanical strength and high thermal and chemical resistance, due at least in part to the high cross-link density which results from bonds that form and become irreversibly set once the composition is cured. Nevertheless, a continued need exists for golf balls incorporating improved thermosetting polyurethane materials which possess, display and exhibit even better properties such as increased tensile strength at break and improved energy at break without meanwhile substantially impacting % elongation at break.

Such materials, if meanwhile producible cost effectively within already existing golf ball manufacturing systems without sacrificing important golf ball properties and performance characteristics including for example resilience (CoR), durability, spin, and "feel", would be particularly desirable. The method of the invention and resulting golf balls produced by same address and fulfill these needs.

SUMMARY OF THE INVENTION

In one embodiment, a method of the invention for producing improved golf balls comprises the steps of: providing a subassembly; forming about the subassembly at least one layer comprised of a thermoset polyurethane which is prepared by mixing as the essential ingredients: (i) at least one long chain soft segment polyol and/or polyamine; (ii) at least one short chain-extending-type species; (iii) at least one isocyanate; and (iv) at least one additional chain-extending-type species; wherein essential ingredients (i) and (ii) are combined (reacted/mixed) to form a first sub-mixture; and then the first sub-mixture and essential ingredient (iii) are combined (reacted/mixed) to form a prepolymer second sub-mixture; and then the prepolymer second sub-mixture is combined (reacted/mixed) with essential ingredient (iv) to form/produce the thermoset polyurethane.

In one embodiment, essential ingredient (ii) may comprise at least one polyol and essential ingredient (iv) may comprise at least one amine. In one such embodiment, essential ingredient (i) may be polytetramethylene glycol, having a moleculer weight of 2000 g/mol; and essential ingredient (ii) may be 1,4-butane diol. Meanwhile, essential ingredient (iii) may be isophorone diisocyanate.

In one embodiment, the first sub-mixture is added to a stoichiometric excess of essential ingredient (iii) such that the prepolymer second sub-mixture has at least 4% unreacted NCO.

In a particular embodiment, essential ingredient (iv) is diethyltoluene diamine.

In a specific embodiment, the stoichiometric ratio of essential ingredient (i) to essential ingredient (ii) may be from 7:1 to 1:4. In one such embodiment, the stoichiometric ratio of essential ingredient (ii) to essential ingredient (iv) is from 1:1 to 1:35.

In another embodiment, essential ingredient (i) may be polytetramethylene glycol (PTMEG), having a moleculer weight of 2000 g/mol; and essential ingredient (ii) may be 3,3'-diaminodiphenylsulfone, which is ground into essential ingredient (i). In this embodiment, essential ingredient (iii) may be isophorone diisocyanate, for example. And the first sub-mixture may be added to a stoichiometric excess of essential ingredient (iii). Moreover, essential ingredient (iv) may be diethyltoluene diamine. In this specific embodiment, the stoichiometric ratio of essential ingredient (i) to essential ingredient (ii) may be from 7:1 to 1:4. Meanwhile, the stoichiometric ratio of essential ingredient (ii) to essential ingredient (iv) may be from 1:1 to 1:35.

In yet another embodiment, essential ingredient (i) and essential ingredient (ii) are combined (reacted/mixed) in a weight percent ratio of about 9:1 based on the total weight of essential ingredients (i), (ii), (iii), (iv) and a colorant, combined. Meanwhile, the first sub-mixture and essential ingredient (iii) are combined (reacted/mixed) in a weight percent ratio of from about 1.5:1 to about 2.5:1 based on the total weight of essential ingredients (i), (ii), (iii), (iv) and a colorant, combined. Moreover, the prepolymer second sub-mixture and essential ingredient (iv) are combined (reacted/mixed) in a weight percent ratio of from about 8:1 to about 8.5:1 based on the total weight of essential ingredients (i), (ii), (iii), (iv) and a colorant, combined.

In one embodiment, essential element (ii) may be selected from selected from the group consisting of 1,3-butanediol, 1,4-butanediol, ethanediol, ethylene glycol, diethylene glycol, triethylene glycol, tetraethylene glycol, tetramethylene glycol, propylene glycol, dipropylene glycol, tripropylene glycol, tetrapropylene glycol, 1,3-propanediol, 1,5-pentanediol, 1,6-hexanediol, 1,10-decanediol, neopentyl glycol, 1,4-cyclo-hexanedimethanol, 1,4-dihydroxycyclohexane, glycerine, trimethylolpropane, dihydroxyethoxy hydroquinone, hydroquinone bis (2-hydroxyethyl) ether, 3-methyl-1, 5-pentane diol, p-xylene glycol, 1,4-bis-(β-hydroxyethoxy) benzene, 1,3-bis-(β-hydroxyethoxy)benzene, cyclohexane 1,4-dimethanol, octane-1,8-diol, 3,3'-diaminodiphenyl sulfone, 4,4'-diaminodiphenyl sulfone, phenylenediamine, and mixtures thereof. In one such embodiment, essential element (iv) is different than essential element (ii).

The invention is also related to golf balls made/produced according to the inventive methods disclosed and claimed herein.

DETAILED DESCRIPTION OF THE INVENTION

Advantageously, in a method of the invention for making a resulting improved golf ball of the invention, a prepolymer second sub-mixture is created by reacting a first sub-mixture of at least one long chain soft segment polyol and at least one chain-extending-type species with at least one isocyanate. The prepolymer second-sub-mixture is then reacted with at least one more chain-extending-type species to produce an improved thermoset polyurethane material. That is, in a method of the invention, the isocyanate/diisocyanate ingredient of the thermoset polyurethane material is not introduced and reacted to create the prepolymer second sub-mixture until after the first sub-mixture of at least one long chain soft segment polyol and at least one chain-extending-type species is created. Furthermore, in a method of the invention, chain-extending ingredients are used in the process not only while making the first sub-mixture but again after creating the prepolymer second sub-mixture.

In total contrast, in conventional methods/processes, the isocyanate is either simultaneously mixed with both the polyol and hydroxyl and/or amine-terminated curing agent in a single step ("one-shot technique"); or alternatively the isocyanate is first reacted with the polyol compound(s) to produce a polyurethane prepolymer, which is only then subsequently reacted with the hydroxyl and/or amine-terminated curing agent(s) (a multi-step reaction called the "prepolymer technique").

Non-limiting examples of an inventive thermoset polyurethane of the invention produced according to the method of the invention appear in TABLES I and II below. Unexpectedly, as demonstrated in the results set forth in TABLE I and TABLE II and accompanying discussion thereof, superior inventive thermoset polyurethane materials having better tensile strength at break and energy to break without meanwhile significantly impacting % elongation at break are produced by a method of the invention wherein the polyol and chain extender are pre-mixed (reacted/combined) before introducing the isocyanate/diisocyanate ingredient and then adding a second/additional chain extender after introducing (reacting/combining/mixing) the isocyanate/diisocyanate ingredient.

TABLE I

| Essential Ingredient No. | INGREDIENTS | Ex. 1 | EX 2 | COMP. Ex. 1 |
|---|---|---|---|---|
| (i) | PTMEG 2000[1] | 48.35% | 54.75% | 61.95% |
| (ii) | 1,4-butanediol | 5.37% | — | — |
| (ii) | 3,3'-diaminodiphenyl sulfone | — | 6.07% | — |
| (iii) | Isophorone diisocyanate | 32.24% | 25.14% | 22.49% |

TABLE I-continued

| Essential Ingredient No. | INGREDIENTS | Ex. 1 | EX 2 | COMP. Ex. 1 |
|---|---|---|---|---|
|  | Percent (%) unreacted NCO groups | 6.0% | 6.0% | 7.0% |
| (iv) | diethyltoluene diamine | 10.47% | 10.47% | 11.99% |
| N/A | TiO2 dispersion | 3.57% | 3.57% | 3.57% |

[1]PTMEG 2000 is a polyether diol based on polytetramethylene ether glycol.

Specifically, as set forth in TABLE I above, inventive thermoset polyurethane materials Ex. 1 and Ex. 2 were made and compared with comparative conventional thermoset polyurethane material Comp. Ex. 1 in order to test and demonstrate the benefits of the thermoset polyurethane materials of the invention made according to a method of the invention compared with conventional thermoset polyurethane materials made by the conventional multi-step "prepolymer technique" describe above as well as further below.

In this regard, referring to TABLE I, inventive thermoset polyurethanes Ex. 1 and Ex. 2 were made. Generally, in each of these examples, essential ingredients (i) and (ii) were pre-mixed/pre-blended (reacted/combined) in an addition funnel to create a first sub-mixture and then slowly added to a flask/vessel containing essential element (iii) in a stoichiometric excess to create a prepolymer second sub-mixture which was permitted to react and exotherm to about 80° C.-90° C. and then held for about an hour, followed by cooling. Subsequently, the prepolymer second sub-mixture was mixed/blended (reacted/combined) with essential ingredient (iv) and colorant to form/create/produce each thermoset polyurethane.

In contrast, conventional thermoset polyurethane material Comp. Ex. 1 was made by mixing the diol and isocyanate to create a diol/isocyanate prepolymer mixture, followed by mixing the diol/isocyanate mixture with the chain extender and colorant.

Specifically, improved thermoset polyurethane Ex. 1 was made using the following steps: creating a first sub-mixture by combining (reacting/mixing) polyether diol based on polytetramethylene ether glycol (PTMEG) with 1,4-butanediol to create a first sub-mixture wherein the PTMEG and 1,4-butanediol are mixed in amounts of 48.35% and 5.37%, respectively, of the entire thermoset polyurethane formulation (100%); followed by creating a prepolymer second sub-mixture by combining (reacting/mixing) the first sub-mixture with isophorone diisocyanate having 6.0% unreacted NCO groups in an amount of 32.24% of the entire thermoset polyurethane formulation; followed by combining (reacting/mixing) the prepolymer second sub-mixture with diethyltoluene diamine in an amount of 10.47% of the entire thermoset polyurethane formulation; and adding TiO2 dispersion in an amount of 3.57% of the entire thermoset polyurethane formulation.

In turn, thermoset polyurethane Ex. 2 was made using the following steps: creating a first sub-mixture by combining (reacting/mixing) polyether diol based on polytetramethylene ether glycol (PTMEG) with 3,3'-diaminodiphenyl sulfone to create a first sub-mixture, wherein the PTMEG and 3,3'-diaminodiphenyl sulfone are combined (reacted/mixed) in amounts of 54.75% and 6.07%, respectively, of the entire thermoset polyurethane formulation (100%); followed by creating a prepolymer second sub-mixture by combining (reacting/mixing) the first sub-mixture with isophorone diisocyanate having 6.0% unreacted NCO groups in an amount of 25.14% of the entire thermoset polyurethane formulation; followed by combining (reacting/mixing) the prepolymer second sub-mixture with diethyltoluene diamine in an amount of 10.47% of the entire thermoset polyurethane formulation; and adding TiO2 dispersion in an amount of 3.57% of the entire thermoset polyurethane formulation.

In contrast, conventional thermoset polyurethane material Comp. Ex. 1 was made by creating a diol/isocyanate mixture by mixing polyether diol based on polytetramethylene ether glycol (PTMEG) with isophorone diisocyanate having 7.0% unreacted NCO groups in relative amounts of 61.95 and 22.49%, respectively, of the entire thermoset polyurethane formulation; followed by mixing the diol/iso mixture with diethyltoluene diamine in an amount of 11.99% of the entire thermoset polyurethane formulation; and adding TiO2 dispersion in an amount of 3.57% of the entire thermoset polyurethane formulation.

Subsequently, each of resulting materials Ex. 1 and Ex. 2 and Comp. Ex. 1 were evaluated for tensile strength at break, energy to break, and % elongation at break pursuant to ASTM D-412, and the results are set forth in TABLE II as follow:

TABLE II

| PROPERTIES | Ex. 1 | Ex. 2 | Comp. Ex. 3 |
| --- | --- | --- | --- |
| Tensile Strength at Break | 5793 psi | 4598 psi | 3650 psi |
| % Elongation | 304% | 359% | 496% |
| Energy to Break | 288 in*lbf | 273 in*lbf | 255 in*lbf |

In this regard, TABLE II reveals that inventive thermoset polyurethanes Ex. 1 and Ex. 2 desirably have better tensile strengths at break of 5793 psi and 4598 psi, respectively, than that of comparative conventional material Comp. Ex. 1 (3650) by 2089 psi and 948 psi, respectively. And meanwhile, inventive thermoset polyurethanes Ex. 1 and Ex. 2 desirably have better energy to break of 288 in*lbf and 273 in*lbf, respectively, than that of comparative material Comp. Ex. 1 (255 in*lbf) by 33 and 18 in*lbf points, respectively—which even though moderate is significant as evident by the large improvements in tensile strengths at break over that of comparative material Comp. Ex. 1. And this result is achieved without meanwhile significantly reducing % elongations of inventive thermoset polyurethanes Ex. 1 and Ex. 2, which are desirably 304% and 359%, respectively.

Accordingly, it is evident from the results above that a thermoset polyurethane of the invention, produced by combining (reacting/mixing) isocyanate(s) with a first sub-mixture of polyol and chain extender create a prepolymer second sub-mixture followed by combining (reacting/mixing) at least one additional chain extender with the prepolymer second sub-mixture, unexpectedly and advantageously displays improved tensile strength at break and energy to break without meanwhile significantly impacting % elongation at break as compared with a conventional thermoset polyurethane formulation produced in a conventional manner by first mixing the diisocyanate with the polyol and only then adding any chain extender.

In one particular embodiment, a polytetramethylene glycol, having a molecular weight of 2000 g/mol (PTMEG 2000), and 1,4-butane diol (BDO) are melted and blended to create the first sub-mixture and then added to a stiochiometric excess of isophorone diisocyanate (IPDI) or any other suitable isocyanate to achieve a prepolymer second sub-mixture with a % NCO of from 4% to 10% or greater. Once the prepolymer second sub-mixture has been made, it can be chain extended or cured with diethyltoluene diamine or any other suitable chain extender to make a final improved thermoset polyurethane.

In another embodiment, 3,3'-diaminodiphenylsulfone (33DDS) is ground into PTMEG 2000 with a cowles blade at a ratio that is similar to the above ratios to create the first sub-mixture. It is then added to a stoichiometric excess of IPDI or any other suitable isocyanate to make a prepolymer second sub-mixture. The prepolymer can then be cured with any suitable chain extender to make a final improved thermoset polyurethane.

Other embodiments are envisioned such as wherein:
i) a first portion of the total amount of PTMEG 2000 is pre-mixed (reacted/combined) with the total amount of BDO to create a first sub-mixture; this first sub-mixture is combined (reacted/mixed) with the total amount of isocyanate to create an intermediate prepolymer sub-mixture; and then the remaining portion of the total amount of PTMEG 2000 is combined (reacted/mixed) with the intermediate prepolymer sub-mixture to create a prepolymer second sub-mixture; followed by reacting the prepolymer second sub-mixture with at least one chain extender and optionally a colorant to create the final improved thermoset polyurethane.
ii) a first portion of the total amount of PTMEG 2000 is pre-mixed (reacted/combined) with a first portion of the total amount of BDO to create a first sub-mixture; this first sub-mixture is combined (reacted/mixed) with the total amount of isocyanate to create an intermediate prepolymer sub-mixture; and then remaining portion of the total amount of BDO is combined (reacted/mixed) with the intermediate prepolymer sub-mixture to create a prepolymer second sub-mixture; followed by combining the prepolymer second sub-mixture with at least one chain extender and optionally a colorant to create the final improved thermoset polyurethane.
(iii) the total amount of PTMEG 2000 is pre-mixed (reacted/combined) with both of a total amount of BDO and a total amount of at least one different polyol and/or polyamine to create a first sub-mixture; this first sub-mixture is then combined (reacted/mixed) with the total amount of one or more isocyanates to create a prepolymer second sub-mixture; which is then combined (reacted/mixed) with at least one chain extender and optionally a colorant to create the final improved thermoset polyurethane.

It is to be understood that "PTMEG 2000" and/or "BDO" used in specific examples/embodiments herein may be blended with or replaced by one or more different "long chain soft segment polyol and/or polyamine"; and/or "short chain-extending-type species", respectively. Furthermore, herein, the terms isocyanate and diisocyanate are generally used herein interchangeably.

In this regard, the term "long chain soft segment polyol and/or polyamine" may include polyester polyols or polyether polyols and may be a polyhydroxy or polyamine compound having a molecular weight from 400 to 6,000. Suitable long chain polyols may generally include linear polyesters, polyethers, polycarbonates, polylactones (eg, ε-caprolactone), and mixtures thereof. In any of these embodiments, a hydrocarbon chain can have saturated or unsaturated bonds, and substituted or unsubstituted aromatic and cyclic groups.

Meanwhile, the terms "short chain-extending-type species" and "additional chain-extending-type species" as used herein each may include polyols and/or polyamines having a molecular weight of less than 400.

In turn, the term, "isocyanate" as used herein, refers to any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. The term "isocyanate" as used herein includes all the isocyanate/diisocyanate compounds disclosed herein and other isocyanates as well.

The term, "polyol" as used herein, generally refers to any aliphatic or aromatic compound containing two or more hydroxyl functional groups. The term "polyol" may be used interchangeably with hydroxy-terminated component.

The term, "polyamine" as used herein, generally refers to any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with the phrase amine-terminated component.

In addition to polyols having hydroxyl end groups, it is envisioned that the polyols may contain carboxyl, amino, or mercapto end groups.

Polyester polyols may be produced by reacting a dicarboxylic acid with a diol or an ester-forming derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerin and trimethylolpropane, tripropylene glycol, tetraethylene glycol, tetrapropylene glycol, tetramethylene glycol, 1,4-cyclohexane-dimethanol. In preparing specific polyesters in practical applications, both dicarboxylic acids and diols can be used individually or as a mixture. Examples of suitable polyester polyols include, but are not limited to, polyethylene adipate glycol, polybutylene adipate glycol, polyethylene propylene adipate glycol, ortho-phthalate-1,6-hexanediol, and combinations thereof.

Polyether polyols may be prepared by ring-opening addition polymerization of alkylene oxide with a polyhydric alcohol polymerization initiator. Examples of suitable polyether polyols are polypropylene glycol (PPG), polyethylene glycol (PEG), polytetramethylene ether glycol (PTMEG). Also, block copolymers such as polyoxypropylene and polyoxyethylene glycol, poly-1,2-oxybutylene and polyoxyethylene glycol, poly-1,4-tetramethylene and polyoxyethylene glycol.

Polycarbonate polyols may be produced by degenerative reaction of diol with phosgene, chloroformate, dialkyl carbonate, and/or diallyl carbonate. Examples of diols in suitable polycarbonate polyols for crosslinked thermoplastic polyurethane elastomers include ethanediol, diethylene glycol, 1,3-butanediol, 1,4-butanediol, 1,6-hexanediol, neopentyl glycol, and 1,5-pentanediol. One suitable polycarbonate includes, but is not limited to, polyphthalate carbonate.

Suitable polycaprolactone polyols include but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof.

The short chain-extending-type species and additional chain-extending-type species may may be identical or differ, although the amounts of essential ingredients (ii) and (iv) included preferably differ. However, each may each be selected for example from one or more polyols, one or more diamines, or a combination thereof. Polyols may be selected for example from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether. hydroquinone-di-(.beta.-hydroxyethyl) ether; trimethylol propane; and combinations thereof.

Polyamines may include, for example, 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and 4,4'-diaminobenzene, or an isomer thereof; 3,3'-diaminodiphenylsulfone, or an isomer thereof; combinations thereof.

Polyamines may also include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE®300. Suitable polyamine curatives, which include both primary and secondary amines, preferably have weight average molecular weights ranging from about 64 to about 2000.

Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weight ranging from about 48 to 2000. Molecular weight, as used herein, is the absolute weight average molecular weight and would be understood as such by one of ordinary skill in the art.

Both the hydroxy-terminated and amine chain extenders can include one or more saturated, unsaturated, aromatic, and cyclic groups. Additionally, the hydroxy-terminated and amine curatives can include one or more halogen groups. While a single chain extending agent may be used, if desired, a blend or mixture of chain extending agents may be used as well.

Catalysts are also sometimes employed to promote the reaction between the isocyanate and polyol compounds for producing the prepolymer or between prepolymer and curing agent during the chain-extending step. The catalyst is often added to the reactants before producing the prepolymer. Examples of such catalysts include bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture such as in an amount from about 0.001 percent to about 1 percent, and preferably 0.1 to 0.5 percent, by weight of the composition.

Examples of hydroxyl-terminated chain-extending agents are typically selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N', N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}-cyclohexane; trimethylolpropane; polytetramethylene ether glycol (PTMEG), preferably having a molecular weight from about 250 to about 3900; and mixtures thereof. In addition, the following hydroxyl-terminated curing agents may be used: 1,7-heptanediol, 1,8-octanediol, 1,9-nonanediol, 1,10-decanediol, 1,11-undecanediol, and 1,12-dodecanediol. However, it is not required that only linear hydroxyl-terminated curing agents containing 1 to 12 carbon atoms be used in the method of this invention. For instance, linear hydroxyl-terminated curing agents containing greater than 12 carbon atoms such as tetradecanoic ($C_{14}$) diols, hexadecanoic ($C_{16}$) diols, and octadecanoic ($C_{18}$) diols may be used. In addition, alkyl or aryl substituted alkane diols containing greater than 12 carbon atoms may be used. As discussed above, the properties of the polyurethane composition depend in significant part upon the components or building blocks used to make the composition, particularly the polyisocyanates, moisture-resistant polyols, and curing agents of this invention. The above-mentioned hydroxyl-terminated curing agents may be used to make polyurethane compositions having enhanced tensile strength, impact durability, scuff/abrasion-resistance, resiliency, as well as moisture-resistance.

Suitable amine-terminated chain-extending agents that can be used in chain-extending the polyurethane prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-) toluenediamine, 3,5-diethylthio-(2,4- or 2,6-)toluenediamine, 3,3'-dimethyl-4,4'-diamino-diphenylmethane, 3,3'-diethyl-5,5'-dimethyl-4, 4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5, 5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4, 4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'[1,4-butanediyl-bis-(oxy)bis]-1-propanamine), diethyleneglycol-bis(propylamine) (i.e., diethyleneglycol-di(aminopropyl)ether), 4,7,10-trioxamidecane-1,13-diamine, 1-methyl-2,6-di-amino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3 '-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3 '-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., N3-amine), glycerin-based triamines, (all saturated); tetramines such as N,N'-bis(3-aminopropyl)ethylene diamine (i.e., N4-amine) (both saturated), triethylene tetramine; and other polyamines such as tetraethylene pentamine (also saturated). The amine chain-extending agents used as chain extenders normally have a cyclic structure and a low molecular weight (250 or less). More preferably, the amine-terminated chain-extending agent can be selected from the group consisting of: 1,3-propane diamine, 1,4-butane diamine, 1,5-pentane diamine, 1,6-hexane diamine, 1,7-heptane diamine, 1,8-octane diamine, 1,9-nonane diamine, 1,10-decane diamine, 1,11- undecane diamine, and 1,12-dodecane diamine, polymethylene-di-p-aminobenzoates, polyethyleneglycol-bis(4-aminobenzoates), polytetramethylene etherglycol-di-p-aminobenzoate, polypropyleneglycol-di-p-aminobenzoate, and mixtures thereof.

Polyamide chain extending agents having multiple amino groups capable of reacting with the isocyanate groups and at least one amide group are also used. Polyamine polyamides can be used, wherein the polyamide chain is formed from condensation polymerization reaction of polyacid (including polyacid telechelic) and polyamine (including polyamine telechelic), with an equivalent ratio of polyamine to polyacid being greater than 1, such as about 1.1-5 or about 2. Mixtures of polyacid and polyamine can be, for example, hexamethylene diammonium adipate, hexamethylenediammonium terephthalate, or tetramethylene diammonium adipate. Alternatively, the polyamide chain can be formed partially or essentially from ring-opening polymerization of cyclic amides such as caprolactam. The polyamide chain can also be formed partially or essentially from polymerization of amino acid, including those that structurally correspond to the cyclic amides. The polyamide chain can comprise multiple segments formed from the same or different polyacids, polyamines, cyclic amides, and/or amino acids, non-limiting examples of which are disclosed herein. Suitable starting materials also include polyacid polymers, polyamine telechelics, and amino acid polymers. At least one polyacid, polyamine, cyclic amide, or amino acid having Mw of at least about 200, such as at least about 400, or at least about 1,000 can be used to form the backbone. A blend of at least two polyacids and/or a blend of at least two polyamines can be used, wherein one has a molecular weight greater than the other. The polyacid or polyamine of smaller molecular weight can contribute to hard segments in the polyamine polyamide, which may improve shear resistance of the resulting elastomer. For example, the first polyacid/polyamine can have a molecular weight of less than 2,000, and the second polyacid/polyamine can have a molecular weight of 2,000 or greater. In one example, a polyamine blend can comprise a first polyamine having a Mw of 1,000 or less, such as JEFFAMINE. 400 (Mw of about 400), and a second polyamine having a Mw of 1,500 or more, such as JEFFAMINE 2000 (Mw of about 2,000). The backbone of the polyamine polyamide can have about 1-100 amide linkages, such as about 2-50, or about 2-20. Polyamine polyamides can be linear, branched, star-shaped, hyper-branched or dendritic (such as amine-terminated hyper-branched quinoxaline-amide polymers of U.S. Pat. No. 6,642,347, the disclosure of which is incorporated herein by reference).

Diamines may include aliphatic, cycolaliphatic or aromatic diamines.

Still other examples of diamines include 1,4-cyclohexyene diamine, benzidine, toluene diamine, diaminodiphenyl methane, isomers of phenylene diamine and/or hydrazine, (4,4'-methylene-bis-o-chloroaniline), and/or (4,4'-methylenebis(3-chloro-2-6-diethyl-laniline).

Suitable isocyanates include for example those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof.

Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H12MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, low free monomer TDI, and low free monomer PPDI.

The at least one polyisocyanate may for example have about 18% or less unreacted NCO groups. In some embodiments, the at least one polyisocyanate has no greater than 8.5% NCO, more preferably from 2.5% to 8.0%, or from 3.0% to 7.2%, or from 5.0% to 6.5%.

In one embodiment, a method of making a golf ball of the invention comprises the steps of: providing a subassembly; forming about the subassembly at least one layer comprised of a thermoset polyurethane which is prepared by mixing as the essential ingredients: (i) at least one long chain soft segment polyol and/or polyamine; (ii) at least one short chain-extending-type species; (iii) at least one isocyanate; and (iv) at least one additional chain-extending-type species; wherein essential ingredients (i) and (ii) are combined (reacted/mixed) to form a first sub-mixture; and then the first sub-mixture and essential ingredient (iii) are combined (reacted/mixed) to form a prepolymer second sub-mixture; and then the prepolymer second sub-mixture is combined (reacted/mixed) with essential ingredient (iv) to form the thermoset polyurethane.

In one embodiment, essential ingredient (ii) may be at least one polyol and essential ingredient (iv) may be at least one amine. In one such embodiment, essential ingredient (i) may be polytetramethylene glycol, having a moleculer weight of 2000 g/mol; and essential ingredient (ii) may be 1,4-butane diol. In one such embodiment, essential ingredient (iii) may be isophorone diisocyanate.

In one embodiment, the first sub-mixture is added to a stoichiometric excess of essential ingredient (iii) such that the prepolymer second sub-mixture is a prepolymer having at least 4% unreacted NCO.

In a particular embodiment, essential ingredient (iv) is diethyltoluene diamine.

In a specific embodiment, the stoichiometric ratio of essential ingredient (i) to essential ingredient (ii) may be from 7:1 to 1:4. In one such embodiment, the stoichiometric ratio of essential ingredient (ii) to essential ingredient (iv) is from 1:1 to 1:35.

In one specific embodiment, essential ingredient (i) may be polytetramethylene glycol (PTMEG), having a moleculer weight of 2000 g/mol; and essential ingredient (ii) may consist of consists of 3,3'-diaminodiphenylsulfone, which is ground into essential ingredient (i). In this embodiment, essential ingredient (iii) may be isophorone diisocyanate for example. And the first sub-mixture may be added to a stoichiometric excess of essential ingredient (iii). Moreover, essential ingredient (iv) may be diethyltoluene diamine. In this specific embodiment, the stoichiometric ratio of essential ingredient (i) to essential ingredient (ii) may be from 7:1 to 1:4. Meanwhile, the stoichiometric ratio of essential ingredient (ii) to essential ingredient (iv) may be from 1:1 to 1:35.

In an even more specific embodiment, essential ingredient (i) and essential ingredient (ii) are combined (reacted/mixed) in a weight percent ratio of about 9:1 based on the total weight of essential ingredients (i), (ii), (iii), (iv) and a colorant, combined. Furthermore, the first sub-mixture and essential ingredient (iii) are combined (reacted/mixed) in a weight percent ratio of from about 1.5:1 to about 2.5:1 based on the total weight of essential ingredients (i), (ii), (iii), (iv) and a colorant, combined. Meanwhile, the prepolymer second sub-mixture and essential ingredient (iv) are combined (reacted/mixed) in a weight percent ratio of from about 8:1 to about 8.5:1 based on the total weight of essential ingredients (i), (ii), (iii), (iv) and a colorant, combined.

In one embodiment, essential element (ii) may be selected from selected from the group consisting of 1,3-butanediol, 1,4-butanediol, ethanediol, ethylene glycol, diethylene glycol, triethylene glycol, tetraethylene glycol, tetramethylene glycol, propylene glycol, dipropylene glycol, tripropylene glycol, tetrapropylene glycol, 1,3-propanediol, 1,5-pentanediol, 1,6-hexanediol, 1,10-decanediol, neopentyl glycol, 1,4-cyclo-hexanedimethanol, 1,4-dihydroxycyclohexane, glycerine, trimethylolpropane, dihydroxyethoxy hydroquinone, hydroquinone bis (2-hydroxyethyl) ether, 3-methyl-1, 5-pentane diol, p-xylene glycol, 1,4-bis-(β-hydroxyethoxy) benzene, 1,3-bis-(β-hydroxyethoxy)benzene, cyclohexane 1,4-dimethanol, octane-1,8-diol, and mixtures thereof. In one such embodiment, essential element (iv) is different than essential element (ii).

The invention also related to golf balls made/produced according to the methods disclosed and claimed herein.

In some embodiments, essential ingredient (i) and essential ingredient (ii) are pre-mixed in a weight (wt.) percent (%) ratio of <90:>10 to about 70:30. In other embodiments, essential ingredient (i) and essential ingredient (ii) are pre-mixed in a weight % ratio of 95:5 to about 60:40. In yet other embodiments, essential ingredient (i) and essential ingredient (ii) are pre-mixed in a weight percent ratio of 85:15 to about 60:40.

In specific embodiments: essential ingredient (i) and essential ingredient (ii) are pre-mixed in a weight (wt.) percent (%) ratio of 48:5 to 55:6.25 to produce the first sub-mixture; and the first sub-mixture is mixed with essential ingredient (iii) in a wt. % ratio of 53:32 to 61.25:25.25 to produce the prepolymer second sub-mixture. The amount of essential ingredient (iii) can be adjusted based on the pre-selected wt. % of first sub-mixture and prepolymer second sub-mixture; for example, in preferred embodiments wherein TiO2 dispersion is included, essential ingredient (iii) may be included in the polyurethane formulation in an amount of between 10 wt. % and 11 wt. % and the TiO2 dispersion may be included in an amount of about 3-4 wt. %.

Conventional Thermoset Polyurethane Manufacturing Processes

It is envisioned that in certain embodiments, at least one other layer of the golf ball may be comprised of a conventional thermoset of thermoplastic polyurethane—for example, in order to create a property gradient between the two given layers. In conventional thermoset polyurethane manufacturing processes, two basic techniques are used to make the polyurethane compositions: a) one-shot technique, and b) prepolymer technique. In the one-shot technique, the isocyanate, polyol, and hydroxyl and/or amine-terminated curing agent are reacted in one step. In contrast, the prepolymer technique involves a first reaction between the isocyanate and polyol compounds to produce a polyurethane prepolymer, followed by a subsequent reaction between the prepolymer and hydroxyl and/or amine-terminated curing agent.

As a result of the reaction between the isocyanate and polyol compounds, there are some unreacted NCO groups in the polyurethane prepolymer. The prepolymer typically has less than 14% unreacted NCO groups. As the weight percent of unreacted isocyanate groups increases, the hardness of the composition also generally increases.

In the one-shot method, the isocyanate compound is typically added to a reaction vessel and then a curative mixture comprising the polyol and curing agent is added to the reaction vessel. The components are mixed together so that the molar ratio of isocyanate compound to total polyol and curing agent compounds is in the range of about 1.01:1.00 to about 1.10:1.00. Preferably, the molar ratio is greater than 1.05:1.00. For example, the molar ratio can be in the range of 1.07:1.00 to 1.10:1.00. In general, the prepolymer technique has preferred because it provides better control of the chemical reaction. In the prepolymer method, the prepolymer is mixed with the curing agent so that the molar ratio of isocyanate groups to hydroxyl groups (and/or amine groups) is in the range of about 1.01:1.00 to about 1.10:1.00. Preferably, the molar ratio is greater than 1.05:1.00. For example, the molar ratio can be in the range of 1.07:1.00 to 1.10:1.00.

The resulting polyurethane prepolymer contains urethane linkages having the following general structure:

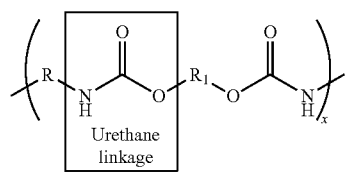

where x is the chain length, i.e., about 1 or greater, and R and $R_1$ are straight chain or branched hydrocarbon chain having about 1 to about 20 carbons In general, polyurethanes are classified as either thermoplastic or thermosetting materials. Thermoplastic polyurethanes have some cross-linking, but it is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

In the conventional prepolymer method, the polyurethane prepolymer is chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight.

When the polyurethane prepolymer is reacted with hydroxyl-terminated curing agents during the chain-extending step, as described above, the resulting composition is essentially a pure polyurethane composition. On the other hand, when the polyurethane prepolymer is reacted with an amine-terminated curing agent during the chain-extending step, any excess isocyanate groups in the prepolymer will react with the amine groups in the curing agent and create urea linkages having the following general structure:

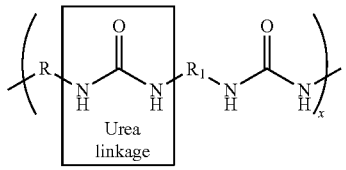

where x is the chain length, i.e., about 1 or greater, and R and $R_1$ are straight chain or branched hydrocarbon chain having about 1 to about 20 carbons.

This chain-extending step, which occurs when the polyurethane prepolymer is reacted with hydroxyl-terminated curing agents, amine-terminated curing agents, or mixtures thereof, builds-up the molecular weight and extends the chain length of the prepolymer. When the polyurethane prepolymer is reacted with hydroxyl-terminated curing agents, a polyurethane composition having urethane linkages is produced. When the polyurethane prepolymer is reacted with amine-terminated curing agents, a polyurethane/urea hybrid composition having urethane and urea linkages is produced. The polyurethane/urea hybrid composition is distinct from the pure polyurethane composition. The concentration of urethane and urea linkages in the hybrid composition may vary. In general, the hybrid composition may contain a mixture of about 10 to 90 wt. % urethane and about 90% to 10 wt. % urea linkages. The resulting polyurethane composition or polyurethane/urea hybrid composition has elastomeric properties based on phase separation of the soft and hard segments. The soft segments, which are formed from the polyol reactants, are generally flexible and mobile, while the hard segments, which are formed from the isocyanate and chain extenders, are generally stiff and immobile.

When one layer of the golf ball also incorporates a conventional polyurethane, non-limiting examples of suitable thermoplastic polyurethanes include TPUs sold under the tradenames of Texin® 250, Texin® 255, Texin® 260, Texin® 270, Texin®950U, Texin® 970U, Texin®1049, Texin®990DP7-1191, Texin® DP7-1202, Texin®990R, Texin®993, Texin®DP7-1049, Texin® 3203, Texin® 4203, Texin® 4206, Texin® 4210, Texin® 4215, and Texin® 3215, each commercially available from Covestro LLC, Pittsburgh Pa.; Estane® 50 DT3, Estane®58212, Estane®55DT3, Estane®58887, Estane®EZ14-23A, Estane®ETE 50DT3, each commercially available from Lubrizol Company of Cleveland, Ohio; and Elastollan®WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

Thus, embodiments are envisioned wherein a golf ball of the invention includes at least one layer of inventive thermoset polyurethane produced by a method of the invention and also a layer of conventional thermoset polyurethane produced by conventional methods such as described above and/or a layer of conventional thermoplastic polyurethane produced by conventional methods such as described above. In such embodiments, property gradients can be created between the layer of inventive thermoset polyurethane and conventional polyurethane.

For example, a tensile strength at break gradient and an energy at break gradient can be created between the two layers without meanwhile substantially impacting % elongation at break. In a specific such example, a golf ball can include a first layer that contains inventive material Ex. 1 of TABLE I and TABLE II formed by the method of the invention, while a second layer of the golf ball contains conventional material Comp. Ex. 1 that is formed via a conventional method discussed above.

In a different such embodiment, a golf ball includes a first layer containing inventive material Ex. 2 of TABLE I and TABLE II formed by the method of the invention, while a second layer of the golf ball contains conventional material Comp. Ex. 1 that is formed via a conventional method discussed above.

Embodiments are also envisioned wherein a tensile strength at break gradient and an energy at break gradient are created in a golf ball of the invention by including two layers of inventive thermoset polyurethane produced by a method of the invention, wherein one of the two layers contains inventive material Ex. 1 of TABLE I and TABLE II, while the other layer contains inventive material Ex. 2 of TABLE I and TABLE II.

At least one layer may be comprised of partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

Ionomers, typically are ethylene/acrylic acid copolymers or ethylene/acrylic acid/acrylate terpolymers in which some or all of the acid groups are neutralized with metal cations. Commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN(® 8140 (Na) and SURLYN® 8546 (Li), which have an methacrylic acid content of about 19 percent.

The acid groups of these high acid ionomer resins that have been neutralized to a certain degree with the designated cation.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form an ionomer according to the present invention. In addition, the ionomer may be a low acid or high acid ionomer. As detailed above, a high acid ionomer may be a copolymer of an olefin, e.g., ethylene, and at least 16 weight percent of an α,β-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the α,β-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

The ionomers may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can include about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or an ammonium-based components, or mixtures thereof, as disclosed in co-pending U.S. patent application Ser. No. 10/875,725, filed Jun. 25, 2004, entitled "Golf Ball Compositions Neutralized with Ammonium-Based and Amine-Based Compounds," which is incorporated in its entirety by reference herein. Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
| --- | --- | --- | --- |
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD1040 | 0.855 | 135 | 60 |
| HPF AD1172 | 0.800 | 32 | 37 |

In one embodiment, an intermediate layer is disposed between the single or multi-layered core and surrounding cover layer. These intermediate layers also can be referred to as casing or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α,β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

At least one layer may be comprised of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions may be as discussed herein.

In general, polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

Other suitable thermoplastic polymers that may be used to form the intermediate layer include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core and intermediate layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic layers may be irradiated at dosages greater than 0.05 Mrd, or ranging from 1 Mrd to 20 Mrd, or ranging from 2 Mrd to 15 Mrd, or ranging from 4 Mrd to 10 Mrd. In one embodiment, the layer may be irradiated at a dosage from 5 Mrd to 8 Mrd and in another embodiment, the layer may be irradiated with a dosage from 0.05 Mrd to 3 Mrd, or from 0.05 Mrd to 1.5 Mrd.

The solid cores for the golf balls of this invention may be made using any suitable conventional technique such as, for example, compression or injection-molding, Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball subassembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be subjected to finishing steps such as flash-trimming, surface-treatment, marking, and one or more coating layer may be applied as desired via methods such as spraying, dipping, brushing, or rolling. Then the golf ball can go through a series of finishing steps.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

The golf balls of this invention provide the ball with a variety of advantageous mechanical and playing performance properties as discussed further below. In general, the hardness, diameter, and thickness of the different ball layers may vary depending upon the desired ball construction. Thus, golf balls of the invention may have any known overall diameter and any known number of different layers and layer thicknesses, wherein the inventive tri-part thermoplastic blend is incorporated in one or more of those layers in order to target desired playing characteristics.

For example, the core may have a diameter ranging from about 0.09 inches to about 1.65 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have any known overall thickness such as within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60

Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

If the ball includes an intermediate layer or inner cover layer, the hardness (material) may for example be about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, or 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

It is envisioned that layers a golf ball of the invention may be incorporated via any of casting, compression molding, injection molding, or thermoforming.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain certain properties in connection with the inventive tri-part thermoplastic blend of the invention as well as other materials that may be incorporated in golf balls of the invention.

Hardness. The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.
Tensile Strength, % Elongation and Energy at Break.

As used herein, each of tensile strength, % elongation and energy at break are measured using ASTM D-412.
Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds. Coefficient of Restitution ("CoR"). The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention, incorporating at least one layer of inventive tri-part thermoplastic blend, as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

What is claimed is:

1. A method of making a golf ball comprising the steps of:
   providing a subassembly;
   forming about the subassembly at least one layer comprised of a thermoset polyurethane which is prepared by mixing the following ingredients:
   (i) at least one long chain soft segment polyol and/or polyamine;
   (ii) at least one short chain-extending species;
   (iii) at least one isocyanate; and
   (iv) at least one additional chain-extending species;
   wherein ingredients (i) and (ii) are combined to form a first sub-mixture; and then the first sub-mixture and ingredient (iii) are combined to form a prepolymer second sub-mixture; and then the prepolymer second sub-mixture is combined with ingredient (iv) to form the thermoset polyurethane.

2. The method of making a golf ball according to claim 1, wherein ingredient (ii) comprises at least one polyol and ingredient (iv) comprises at least one amine.

3. The method of making a golf ball according to claim 2, wherein ingredient (i) is polytetramethylene glycol, having a moleculer weight of 2000 g/mol; and ingredient (ii) is 1,4-butane diol.

4. The method of making a golf ball according to claim 3, wherein ingredient (iii) is isophorone diisocyanate.

5. The method of making a golf ball according to claim 2, wherein the first sub-mixture is added to a stoichiometric excess of ingredient (iii) such that the prepolymer second sub-mixture has at least 4% unreacted NCO.

6. The method of making a golf ball according to claim 4, wherein ingredient (iv) is diethyltoluene diamine.

7. The method of making a golf ball according to claim 6, wherein the stoichiometric ratio of ingredient (i) to ingredient (ii) is from 7:1 to 1:4.

8. The method of making a golf ball according to claim 7, wherein the stoichiometric ratio of ingredient (ii) to ingredient (iv) is from 1:1 to 1:35.

9. The method of making a golf ball according to claim 1, wherein ingredient (i) is polytetramethylene glycol, having a moleculer weight of 2000 g/mol; and ingredient (ii) is 3,3'-diaminodiphenylsulfone, which is ground into ingredient (i).

10. The method of making a golf ball according to claim 9, wherein ingredient (iii) is isophorone diisocyanate.

11. The method of making a golf ball according to claim 10, wherein the first sub-mixture is added to a stoichiometric excess of ingredient (iii).

12. The method of making a golf ball according to claim 11, wherein ingredient (iv) is diethyltoluene diamine.

13. The method of making a golf ball according to claim 12, wherein the stoichiometric ratio of ingredient (i) to ingredient (ii) is from 7:1 to 1:4.

14. The method of making a golf ball according to claim 13, wherein the stoichiometric ratio of ingredient (ii) to ingredient (iv) is from 1:1 to 1:35.

15. The method of making a golf ball according to claim 1, wherein ingredient (i) and ingredient (ii) are combined in a weight percent ratio of about 9:1 based on the total weight of ingredients (i), (ii), (iii), (iv) and a colorant, combined.

16. The method of making a golf ball according to claim 15, wherein the first sub-mixture and ingredient (iii) are combined in a weight percent ratio of from about 1.5 to about 2.0 based on the total weight of ingredients (i), (ii), (iii), (iv) and a colorant, combined.

17. The method of making a golf ball according to claim 16, wherein the prepolymer second sub-mixture and ingredient (iv) are combined in a weight percent ratio of from about 8:1 to about 9:1 based on the total weight of ingredients (i), (ii), (iii), (iv) and a colorant, combined.

18. The method of claim 1, wherein ingredient (ii) is selected from the group consisting of 1,3-butanediol, 1,4-butanediol, ethanediol, ethylene glycol, diethylene glycol, triethylene glycol, tetraethylene glycol, tetramethylene glycol, propylene glycol, dipropylene glycol, tripropylene glycol, tetrapropylene glycol, 1,3-propanediol, 1,5-pentanediol, 1,6-hexanediol, 1,10-decanediol, neopentyl glycol, 1,4-cyclo-hexanedimethanol, 1,4-dihydroxycyclohexane, glycerine, trimethylolpropane, dihydroxyethoxy hydroquinone, hydroquinone bis (2-hydroxyethyl) ether, 3-methyl-1,5-pentane diol, p-xylene glycol, 1,4-bis-(β-hydroxyethoxy)benzene, 1,3-bis-(β-hydroxyethoxy)benzene, cyclohexane 1,4-dimethanol, octane-1,8-diol, and mixtures thereof.

19. A golf ball made according to the method of claim 1.

* * * * *